United States Patent [19]

Rohde

[11] 4,428,456
[45] Jan. 31, 1984

[54] LOOKOUT CONVERTIBLE TO A COMPACT DOLLY

[76] Inventor: Earl C. Rohde, 327 Green, Muscatine, Iowa 52761

[21] Appl. No.: 464,034

[22] Filed: Feb. 4, 1983

[51] Int. Cl.³ .................... E04G 1/24; A01M 31/02
[52] U.S. Cl. .................................... 182/20; 182/129; 182/120
[58] Field of Search .............. 182/20, 129, 178, 179, 182/187, 116, 120, 88; 108/152; 52/637, 638

[56] References Cited

U.S. PATENT DOCUMENTS

| | | | |
|---|---|---|---|
| 848,304 | 3/1907 | Hines | 52/637 |
| 2,806,560 | 9/1957 | Cox | 52/637 |
| 3,282,375 | 11/1966 | Ray | 182/16 |
| 3,371,458 | 3/1968 | Sturgill | 182/178 |
| 3,547,224 | 12/1970 | Watts | 182/179 |
| 3,637,046 | 1/1972 | Emmons | 182/20 |
| 3,915,303 | 10/1975 | Tatham | 182/178 |
| 4,045,040 | 8/1977 | Fails | 182/20 |
| 4,274,908 | 6/1981 | Hughes | 182/116 |

FOREIGN PATENT DOCUMENTS

| | | | |
|---|---|---|---|
| 853338 | 10/1952 | Fed. Rep. of Germany | 182/120 |
| 360858 | 4/1938 | Italy | 52/637 |
| 8398 | of 1887 | United Kingdom | 182/20 |

Primary Examiner—R. P. Machado
Assistant Examiner—Alvin Chin-Shue
Attorney, Agent, or Firm—Glenn H. Antrim

[57] ABSTRACT

A preferred tower of a lookout is triangular in cross section and tapers inwardly from the bottom to top. The tower has an upper and a lower section of about equal lengths, and the tower can be easily and quickly disassembled, and then the sections nested for easy transportation and storage. When the sections are nested, wheels that extended outward from a side near the bottom of the tower become wheels of a dolly to help transport the components of the tower and any load tied upon the nested sections. An extending platform as a stand or a footrest is removable from near the top of the tower and readily stowed within the nested sections.

4 Claims, 4 Drawing Figures

LOOKOUT CONVERTIBLE TO A COMPACT DOLLY

BACKGROUND OF THE INVENTION

This invention pertains to towers as lookouts and particularly to a tower convertible into a compact dolly.

Various types of stands are available for hunters that prefer to quietly wait for game such as deer to pass along a usual run. A commonly used stand is a tripod having a seat mounted at its top and a footrest below the seat. The lightest and simplest stands are probably those that merely comprise a platform that is supported by a strap about a tree trunk. In spite of claims to the contrary, concern has been expressed, especially with respect to trees on public lands, that trees to which the stands are attached might be damaged. None of these stands have the ease of climbing like a ladder; nor generally, the structural rigidity of a tower; nor the portability of a structure of substantial size such as afforded by wheels positioned at the bottom of extension ladders.

SUMMARY OF THE INVENTION

The lookout of this invention has a rigid tower that is easily disassembled into sections, and the sections are easily nested for transportation and storage. Also, the lower section has an outwardly extending wheel assembly such that the tower is converted into a dolly when it is nested. A load, such as game, can be tied to the nested section to be carried on the dolly.

A preferred tower has two sections that are triangular in cross section and are about equal lengths. The sections gradually decrease in cross section from bottom to top sufficiently to allow the upper section to nest easily into the lower section. Horizontal cross members between vertical supporting members are spaced to function as steps of a ladder when the sections are assembled into a tower. The uppermost cross members across the three sides are used as a frame to which an upper platform for a seat is attached, and an outwardly extending platform is removably positioned on the second cross members from the top at a suitable distance below the top platform to function as a footrest while the top platform is used as a seat.

DESCRIPTION OF THE PREFERRED EMBODIMENT

Figure 1:
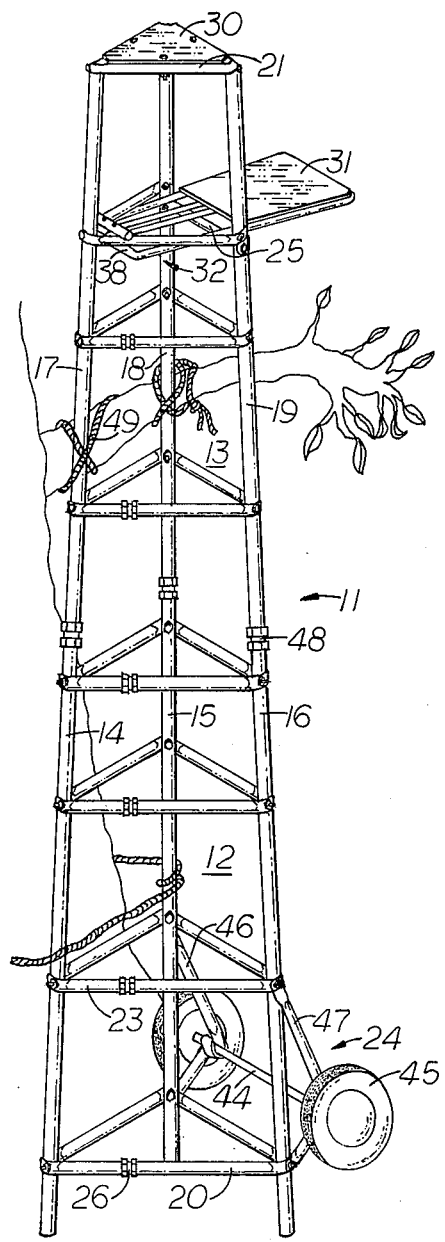
FIG. 1 is a perspective side view of the lookout of this invention.

A preferred tower 11 of FIG. 1 has a lower section 12 of triangular cross section coupled to and supporting an upper section 13. Although the tower may have other polygonal cross sections, the triangular form is likely the simplest and most practical. The lower section 12 has vertical supporting members 14–16 positioned at three respective corners and a plurality of horizontal triangular cross members such as the lower cross member 20, and likewise, the upper section 13 has vertical supporting members 17–19 and a plurality of spaced cross members such as the upper cross member 21.

Figure 2:
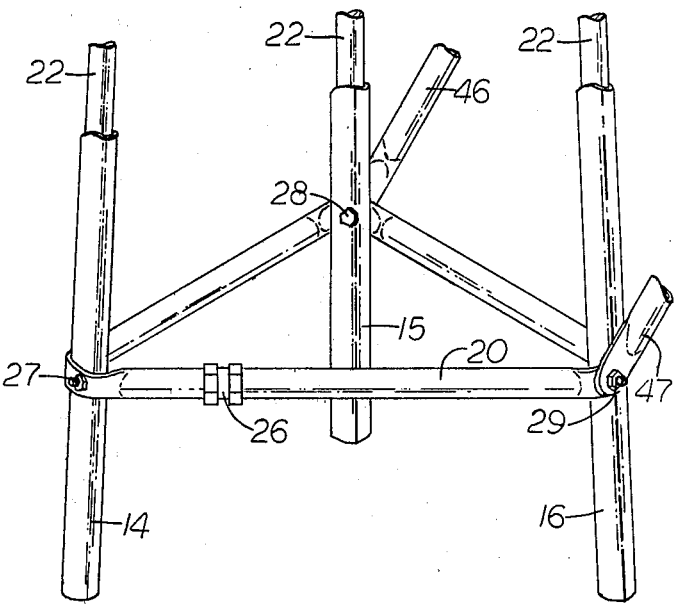
FIG. 2 is an enlarged, perspective view of the bottom portion of the tower.

For a typical tower according to this description, the length of each of the supporting members 14–19 is 5 feet (1.5 m), and is fabricated from ¾-inch (19-mm) thin-wall conduit. In order for the sections 12 and 13 of the tower 11 to be fastened together so that the tower 11 can be easily assembled and disassembled, the upper ends of the supporting members 14–16 of the lower section 12 are provided with conduit couplers to be fastened to the lower ends of the supporting members 17–19 of the upper section 13. As shown in FIG. 2, the lower ends of the supporting members 14–16 are filled with closely fitting wooden dowels 22 up to a level at least a little higher than the cross member 23 above the lowest cross member 20. The dowel serves to strengthen the lower ends of the supporting members and particularly to provide a more rigid structure for fastening a wheel assembly 24.

The cross member 20 at the lower end of the lower section 12 and intermediate cross members up to the cross member 21 at the upper end of the section 13 are spaced along the vertical supporting members 14–19 to provide rigidity and to function as steps of a ladder. The word "cross member" as used in this description generally refers to all three portions along the sides at a respective level. However, because of the different construction of the first cross member below the top cross member of the upper section 13, the portions of the cross member at each side at that level are considered separately. The lengths of the cross members increase in small amounts from the bottom of the tower 11 to the top according to a desired inward taper toward the top. For example, the distance between the supporting members 14–16 near the bottom of the tower along one side of the lowest triangular cross member 20 is 22 inches (559 mm), and the corresponding distance at the upper cross member 21 of the upper section 13 is 16 inches (406 mm).

The bottom cross member 20 and the intermediate cross members up to the cross member 21 may each be fabricated from ½-inch (12.7-mm) thin-wall tubing and each may be fabricated from a single piece except for the second from the top cross member that comprises a portion 25 made from one piece and adjacent portions 33 and 34 made from another piece. In order to complete the triangular shape of the cross sections fabricated from one piece, the ends are fastened together with a thin-wall coupler 26 (FIG. 2). At each level at which a cross member is to be placed, the distance between the vertical supporting members 14–19 are determined, and these distances are marked along respective pieces of tubing for the cross members. The distances are preferably determined such that the couplers 26 are positioned about one-third the distance from one of the supporting members 14–19 and an adjacent supporting member. At the equally spaced positions on the tubing, the tubing is flattened for a length just sufficient to provide a 60 degree bend closely about a respective one of the supporting members 14–19. A hole is drilled through the center of each bend and diametrically through the respective supporting members 14–19 in the direction of an altitude of the triangle formed by the respective cross member such that a bolt 27–29 (FIG. 2) can be inserted through the flattened bend of the member such as cross member 20 and a respective supporting member 14–19. In order that the upper section 13 can be moved readily longitudinally within the lower section 12 when the sections are nested, the bolts such as the bolts 27–29 for the lower section 20, are inserted from inside the tower outward for the lower section 12 and are inserted from outside the tower toward the inside of the tower for the upper section 13.

The top platform 30 is a triangular piece cut from ½-inch (12.7 mm) plywood, and is the required size to have its edges overlap the top cross member 21 to be retained by spaced bolts down through the edges and the cross member. Another platform 31 extends as a shelf from one side of the section 13 supported on the cross member 25 below the top cross member 21 at a level to function as a footrest for a person seated on the top platform 30.

Figure 3:
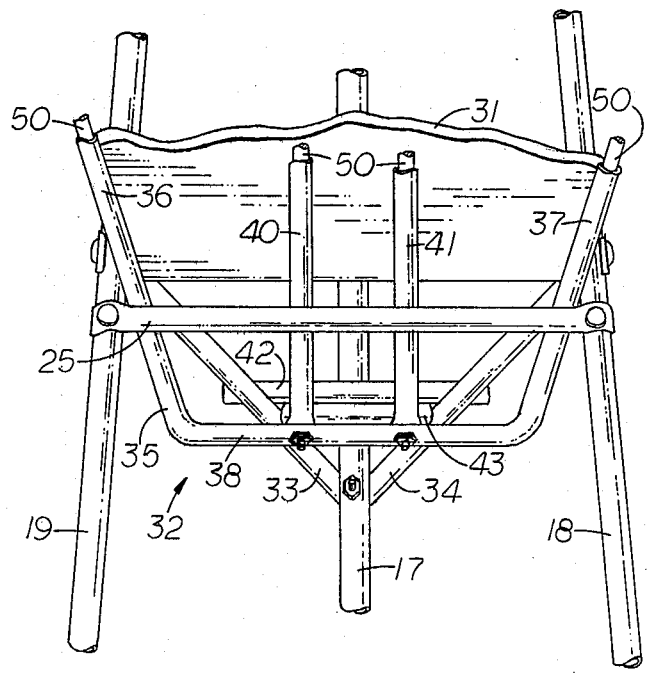
FIG. 3 is a fragmentary perspective view of a portion near the top of the tower to show mounting of the extending platform.

As shown more clearly in FIG. 3, the shape of the frame 32 for the extending platform 31 and the placement of the different portions 25, 33 and 34 for the first cross member below the platform 30 permit the platform 31 to be supported by inserting a portion of the frame 32 into the side of the tower in a way that a drawer slides. For the cross member at the level of the extending platform 31, the portions 25, 33 and 34 of the cross member are fabricated from two pieces of thin-wall conduit rather than from one piece as shown at the other levels. When the peripheral portion 35 of the frame 32 is preferred ¾-inch (19-mm) thin-wall conduit, the portion 25 of the cross member is positioned ¾-inch (19 mm) below the portions 33 and 34 which are both fabricated from a single piece of ½-inch (12.7-mm) thin-wall conduit different from the piece used for the portion 25 of the cross member. The ends of the piece of conduit for the portion 25 are flattened and curved to fit about the respective supporting members 18 and 19, and the middle and both ends of the piece for portions 33 and 34 of the cross member are flattened and curved to fit closely about the supports 17–19 to which they are attached. The outer frame 35 is trapezoidal with equal non-parallel sides 36 and 37 slanted inward slightly at the same angle toward a small end of the frame 32. The strength of the frame 32 is increased by inserting lengths 50 of wooden dowel in the frame as it is bent during construction. The trapezoidal platform 31 is conveniently cut from a ½-inch (12.7-mm) piece of plywood and has an outer edge overlapping and bolted to the sides 36 and 37 and the end 39 (FIG. 4) of the frame 32. The inner edge of the platform 31 is spaced from the smaller end 38 of the frame 32. One or more intermediate longitudinal members 40 and 41 of ½-inch (12.7-mm) conduit filled with pieces of wooden dowel are connected as required according to the thickness of the board used for platform 31 to provide required strength.

A retaining bar 42 is connected to the smaller end 38 of the frame 32 to prevent any vertical movement of that end. As shown in FIG. 3, the dimensions of the frame 32 are such that when the smaller end 38 is pushed inward toward the opposite supporting member 17, the sides 36 and 37 of the frame 32 come in contact with supporting members 19 and 18 respectively, and the smaller end 38 bears upwardly against the cross members 33 and 34 at points spaced approximately one-third of the way from the supporting member 17. A spacer 43 having a diameter equal to or slightly greater than the diameter of the cross members 33 and 34 is positioned over the central portion of the smaller end 38 and is of such length to fit rather closely between the cross members 33 and 34. The retaining bar 42 fastened over the spacer 43 has ends that extend beyond the spacer to fit closely over the cross members 33 and 34. The spacer 43 and the retaining bar 42 are secured to the smaller end 38 of the frame 32 in a usual manner by bolts.

Figure 4:
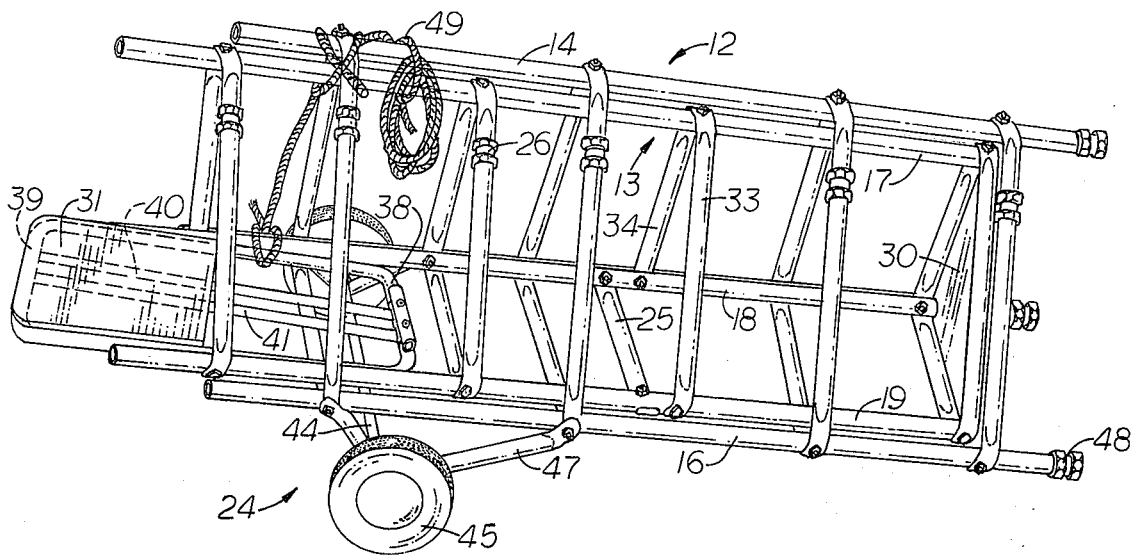
FIG. 4 is a side perspective view of the sections of the tower of FIG. 1 nested to form a dolly.

The wheel assembly 24 shown in FIGS. 1 and 4 comprises an axle 44, a pair of wheels 45, and a pair of brackets 46 and 47. The axle 44 can readily be made by inserting a concrete anchor in each end of a length of ½-inch (12.7-mm) conduit and using a bolt, ½ inch (12.7 mm) by 3½ inches (89 mm) long, at each end through a wheel 45 and turned into the respective anchor. The type of anchor that is readily available is an expandable plug having a threaded hole in which a ½-inch (12.7-mm) bolt is turned to expand the plug tightly in the end of the conduit used for the axle 44. The brackets 46 and 47 secure the axle 44 to the supporting members 15 and 16 respectively and may each comprise a single piece of tubing that is flattened intermediate its ends. The flattened portion is turned tightly somewhat more than a turn about the axle 44 near a respective end of the axle. Each end of each of the brackets is flattened and drilled to have a hole the same size as the holes through the cross members 20 and 23 and the supporting member 14–16 to which they are attached. The brackets 46 and 47 are of such length that the ends are attached to the supporting members 15 and 16 by the same bolts that connect the cross members 20 and 23 to the supporting members 15 and 16. By this manner as shown in FIG. 2, the bracket 46 has one end connected by a bolt 28 to both the supporting member 15 and the cross member 20 as shown in FIG. 2 and the other end is also connected to the supporting member 15 in the same manner at the cross member 23 (FIG. 1). Likewise, the bracket 47 has one end connected by a bolt 29 (FIG. 2) to the supporting member 16, and the other end connected to the supporting member 16 at the cross member 23.

For transportation and storage, the upper section 13 of the tower 11 is nested inside the lower section 12 as shown in FIG. 4, and the extending platform 31 has the more narrow end 38 of its frame within that which during use is the lower end of the upper section 13. The wheels 45 are positioned to roll over the ground while those ends of section 12 normally coupled to the section 13 of the supporting members 15 and 16 function as handles of a dolly.

After the tower is wheeled to a location near a tree or other rigid upright structure where it is to be used, the extending platform 31 is withdrawn from the nested sections 12 and 13, and the sections are separated to be connected by the couplers 48. The tower 11 is then erected such that at least one of the supporting members, for example, supporting member 15, can be tied to a limb or other rigid structure at a point spaced well above the base of the tower 11. The cross members 20 and 23 and higher cross members are used as steps, and extending platform 31 is inserted for use as either a footrest or a stand. After the lookout is again reassembled to be used as a dolly, the rope 49 can be used to tie any large game, such as a deer, over the supporting member 14 that is at the top of the dolly.

I claim:

1. A lookout convertible to a compact dolly comprising:
   a tower having a plurality of similarly shaped gradually tapered elongated sections joined end to end, each of said sections having first, second and third sides as an equilateral triangle in cross section, the width of each of said sides of each of said sections gradually decreasing from bottom to top such that each of said sections individually and said tower of said sections while joined are gradually tapered inward from bottom to top, a plurality of couplers, said couplers connecting said sections together end to end and being easily loosened to separate said sections, said separated sections being easily nested longitudinally one within the other, the overall length of said sections while nested being little more than the length of any one of said sections, a wheel assembly secured to one of said sides of the one of said sections to be at the bottom of said tower, and said wheel assembly positioned to permit said sections while nested to be wheeled as a dolly, a top platform secured across said top of said tower, an extending platform assembly having an extending platform frame and an extending platform attached thereto, said extending platform frame being supported by said tower at a suitable level for said extending platform to function as a footrest while said top platform functions as a seat, a first cross member secured across said first side of said tower at the level of said extending platform assembly, second and third cross members secured across respective ones of said second and third sides adjacent said first side of said tower at a level somewhat above the level of said first cross member, one end of said extending platform frame being shaped to slide like a drawer over said first cross member into said tower and the difference in level between said first cross member and the level of said second and third cross members being sufficient to permit said one end of said extending platform frame to slide under and in contact with said second and third cross members while said extending platform frame is substantially horizontal and slid inward over said first cross member, a retaining bar secured over said one end of said extending platform frame and having ends thereof extending closely over said second and said third cross members respectively to prevent any vertical movement of said one of said extending platform assembly while inserted into said tower.

2. A lookout comprising:

a tower of triangular cross section having a plurality of sections, a plurality of couplers, said couplers joining said sections end-to-end and easily loosened to separate said sections, said sections being tapered inward sufficiently from bottom to top to permit said separated sections to be nested compactly for transportation, a top platform disposed across the top of said tower and a removable extending platform assembly extending from one side near the top of said tower, said platform assembly having an extending platform positioned at a level to function as a footrest and a stand with respect to said top platform as a seat, a first cross member secured across said one side of said tower at the level of said extending platform, said extending platform assembly having the required dimensions for one end thereof to slide over said first cross member into said tower like the sliding of a drawer, second and third cross members secured across respective sides adjacent said one side, said second and third cross members being at a level just sufficiently above the level of said one end of said extending platform assembly while inserted in said tower for said one end of said extending platform assembly to slide under and contact said second and third cross members while said extending platform is horizontal.

3. A lookout as claimed in claim 2 wherein an elongated spacer and an elongated retainer positioned substantially parallel to said one side of said tower are fastened successively over said one end of said extending platform assembly, said spacer fitting between said second and third cross members while said extending platform is positioned for use, and the ends of said retainer extending over respective ends of said spacer to slide closely over said second and third cross members.

4. A lookout as claimed in claim 3 having a wheel assembly secured to one side of the one of said sections to be at the bottom of said tower, and said wheel assembly positioned to permit said sections while nested to be wheeled as a dolly.

* * * * *